Oct. 12, 1971     V. V. WARD     3,611,614

FISHING LURE

Filed Sept. 24, 1969

INVENTOR.
Virgil V. Ward
BY John A. Hamilton
Attorney.

United States Patent Office 3,611,614
Patented Oct. 12, 1971

3,611,614
FISHING LURE
Virgil V. Ward, Box 118, Amsterdam, Mo. 64723
Filed Sept. 24, 1969, Ser. No. 860,618
Int. Cl. A01k 85/00
U.S. Cl. 43—42.24
3 Claims

ABSTRACT OF THE DISCLOSURE

A fishing lure consisting of an insect-like body member of very soft plastic having the shank portion of a fishhook molded longitudinally therein, the point and eye portions of said hook being laterally offset in the same direction from said shank to project outwardly from said plastic body, and one or more enlargements affixed to said shank and molded in said plastic body, said enlargements serving both as weights to hold the hook in a desired position in use, and to hold the plastic body in secure engagement with the hook.

---

This invention relates to new and useful improvements in fishing lures, and has particular reference to a fishing lure of the type consisting of a fishhook embedded in and projecting from a soft plastic body resembling an insect or other natural prey of the fish.

Fishing lures of this general type have come into wide usage, particularly with lure bodies formed of an extremely soft, almost jelly-like plastic, since lure bodies of this consistency have been found to possess certain advantages. Such plastic is pliably flexible to a marked degree, providing the "wiggling" action so attractive to fish in that it resembles the action of natural bait as the lure is drawn through the water. Also, it has a natural "feel" to fish when the fish bite or otherwise contact it, so that they do not shy away or recoil from it as they often do when the lure is hard or otherwise "foreign" to the feel of natural bait. Such plastic lure bodies also lend themselves readily, in the process of molding them, to being easily colored, and to being given any desired shape, and to grooving or otherwise contouring the external surfaces thereof, all with the purpose of giving them a closer resemblance to natural bait.

However, such soft plastic lure bodies are also subject to the disadvantage that they are inherently quite fragile, tending to be easily ripped or torn away from the hook by fish, especially if the body includes portions extending away from the hook to substantial distances, and if the fish should bite down on said extended portions and exert pulling forces thereon.

Accordingly, the principal object of the present invention is the provision of a fishing lure of the general character described but having novel means anchoring the fishing hook firmly in the lure body, whereby said body cannot be easily ripped or torn away from said hook.

Another object is the provision of a fishing lure of the character described wherein said anchoring means also serves the additional function of imparting to the lure an appearance more nearly resembling that of natural bait.

A further object is the provision of a fishing lure of the character described wherein said anchoring means also serves the additional function of insuring positioning of the lure in the water in such a manner as to minimize the chances that the hook will become fouled in underwater weeds or the like.

Other objects are simplicity and economy of construction, and efficiency and dependability of operation.

Figure 1:
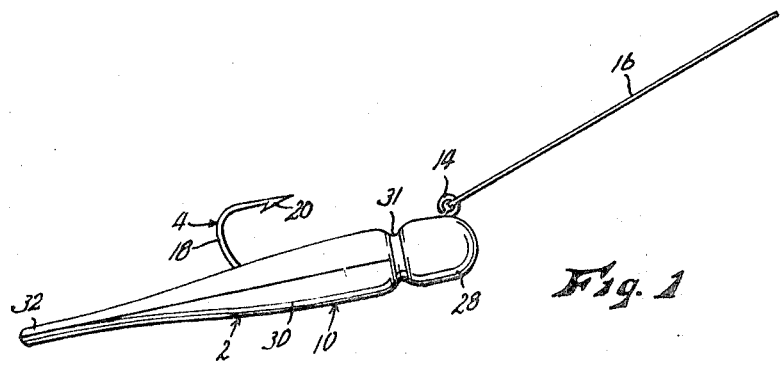
Figure 2:
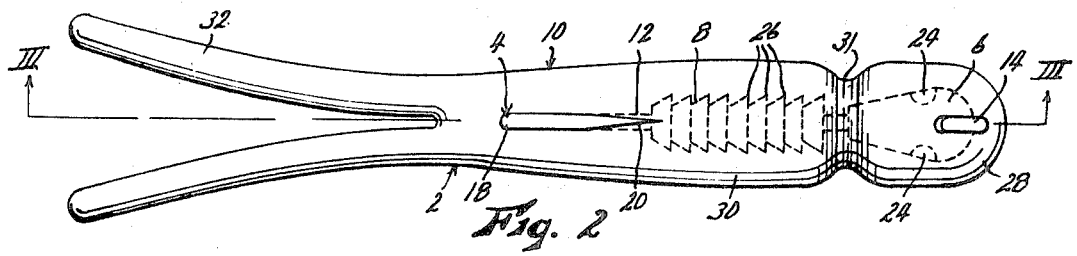
Figure 3:
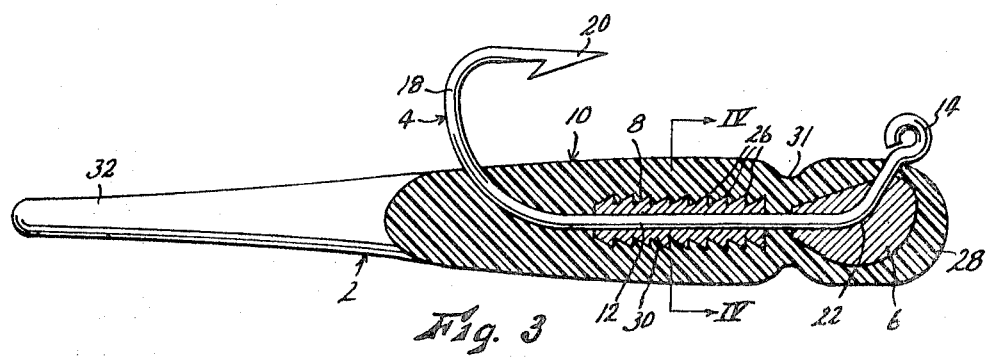
Figure 4:
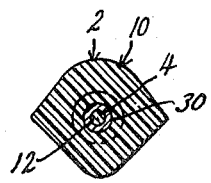

With these objects in view, as well as other objects which will appear in the course of the specification, reference will be had to the accompanying drawing, wherein:

FIG. 1 is a side elevational view of a fishing lure embodying the present invention shown attached to a fishing line and in a position assumed in the water during use, FIG. 2 is an enlarged plan view of the lure as shown in FIG. 1, FIG. 3 is a sectional view taken on line III—III of FIG. 2, and FIG. 4 is a sectional view taken on line IV—IV of FIG. 3.

Like reference numerals apply to similar parts throughout the several views, and the numeral 2 applies generally to a fishing lure embodying the present invention, said lure consisting of a fishhook 4, a pair of enlargements 6 and 8 affixed to the shank of said fishhook, and a plastic lure body 10 molded about said enlargements and portions of said fishhook.

Fishhook 4 consists of a length of wire formed to present a shank 12 which is straight for a major portion of its length, an eye 14 at one end of the shank for the attachment of a fishing line or leader 16 thereto, and a rebent bight portion 18 at the opposite end of the shank, there being a barbed point 20 at the outer end of said bight, projecting toward the eye end of the shank. Adjacent eye 14, shank 12 is bent as indicated at 22 so that the eye is offset laterally from the major portion of said shank in the same direction as point 20.

Enlargement 6 consists of a small body of lead or the like molded or affixed about shank 12 at bend 22 thereof, and shaped to resemble somewhat the head of an insect or the like. As shown in FIG. 2, spots 24 resembling insect eyes may be pointed or otherwise applied to the enlargement.

Enlargement 8 consists of a generally cylindrical body of lead or the like molded or otherwise coaxially affixed about the shank 12 of the fishhook, and extending from a point adjacent head enlargement 6 to a point adjacent the curved bight portion 18 of the hook. The external surface of enlargement 8 has a continuous series of grooves formed peripherally therein, whereby said surface constitutes a series of circular edges or "teeth" 26. Preferably, said teeth are inclined toward the eye end of the shank, as shown.

Body 10 is formed of an extremely soft, virtually jelly-like plastic, such as is already in use in many "wiggler" types of lures, molded about hook shank 12 and enlargements 6 and 8. Said plastic is effectively transparent, although it may be colored as desired to more closely resemble natural baits. Said body is preferably shaped externally to resemble an insect or other natural bait. As shown, it consists of a head portion 28 enclosing enlargement 6, hook eye 14 being disposed externally of said head, an elongated trunk portion 30 in which enlargement 8 is generally coaxially disposed, and connected to head portion 28 by a reduced neck portion 31, bifurcated tail portion 32 extending rearwardly from the trunk portion in general alignment therewith.

In use, the line is attached by eye 14 to fishing line or leader 16 and drawn through the water, assuming the position indicated in FIG. 1. During this movement, the portions of the divided tail 32 of the body flutter or oscillate, producing a realistic "swimming" action well known to be attractive to fish, due to the pliably flexible consistency of the plastic of which they are formed. Also, the softness and skin-like "feel" of the plastic, when fish bite on or touch it, is apparently reassuring to the fish, so that they do not recoil away from the lure as they often do from hard lures. The enlargements 6 and 8 reinforce the lure and securely bind the plastic body to the hook, so that said body cannot be torn or ripped away from the hook, as for example by a fish clamping its jaws on tail 32 and pulling. Such damage to soft plastic lures, and of course the resultant loss of a catch, has heretofore been quite common, due to the previously-mentioned inherent fragility and weakness of the plastic materials, otherwise possessing the desired characteristics. The grooves and ridges 26 of enlargement 8 serve to further anchor the plastic body to the hook. Since any pull exerted on the plastic body by a fish is almost certainly in a direction away from eye 14 of the hook, it is preferred that ridges 26 be inclined toward said eye, so as to provide maximum resistance to said pull. Enlargement 8 is particularly effective in preventing tensile rupture of the lure body at the point it is weakened by neck 31.

Since the eye 14 and point 20 of the hook are offset laterally from hook shank 12 in the same direction, the weight of enlargements 6 and 8 tends to maintain the line in the position shown, with point 20 of the hook uppermost. Said point is thus shielded from below by the close proximity of the lure body 10 thereto, and the likelihood of the fouling of said hook by snagging thereof in underwater weeds or the like is thereby greatly reduced. To assist in this action, it is preferable that said enlargements be formed of a heavy material, such as lead.

If the plastic material of which lure body 10 is formed is transparent as described, enlargements 6 and 8 serve the additional function of providing a more realistic appearance to the lure. Many underwater insects and other natural baits are transparent or semi-transparent, except for more opaque heads and spiny vertebrae or skeletal forms in their trunk portions, and enlargements 6 and 8 respectively provide simulated appearances of said head and trunk frames. The ribbed and grooved contour of enlargement 8 assists in simulating the irregular or "spiny" appearance of the vertebra structure of such bait creatures.

While I have shown and described a specific embodiment of my invention, it will be readily apparent that many minor changes of structure and operation could be made without departing from the spirit of the invention.

What I claim as new and desire to protect by Letters Patent is:

1. A fishing lure comprising:
  (a) a fishhook having a shank portion, a rebent bight and point at one end of said shank and an eye at the opposite end of said shank,
  (b) an elongated lure body of a very soft pliable plastic formed coaxially about said shank with the point and eye portions of said hook projecting outwardly therefrom, said lure body being formed to resemble a natural bait creature, having successive head, trunk, and tail portions, said head and trunk portions being connected by a reduced neck portion, said hook eye being disposed adjacent said head portion and said hook shank extending longitudinally through said neck and trunk portions,
  (c) an enlargement member secured to said shank within the trunk portion of said lure body, and
  (d) a second enlargement secured to said hook shank within the head portion of said lure body.

2. A fishing lure comprising:
  (a) a fishhook having a shank portion, a rebent bight and point at one end of said shank and an eye at the opposite end of said shank,
  (b) an enlargement member secured to said shank, and
  (c) an elongated lure body of very soft pliable plastic formed coaxially about said shank and enlargement member with the point and eye portions of said hook projecting outwardly therefrom, said lure body being generally transparent and said enlargement being configurated to simulate the appearance of the skeletal structure of a natural bait creature.

3. A fishing lure as recited in claim 1 wherein said lure body is generally transparent, and wherein said enlargements are configurated to simulate the appearance of the skeletal structures respectively of the trunk and head portions of said natural bait creature.

References Cited

UNITED STATES PATENTS

| | | | |
|---|---|---|---|
| 2,231,949 | 2/1941 | Rinehart | 43—42.37 X |
| 2,817,922 | 12/1957 | Takeshita | 43—42.37 X |
| 2,994,151 | 8/1961 | Webb | 43—42.37 X |
| 3,465,466 | 9/1969 | Showalter | 43—42.37 X |

SAMUEL KOREN, Primary Examiner

D. J. LEACH, Assistant Examiner

U.S. Cl. X.R.

43—42.33, 42.37, 42.39